Jan. 12, 1954  C. SCHÖRNER  2,665,880
TURBINE ROTOR
Filed July 17, 1951
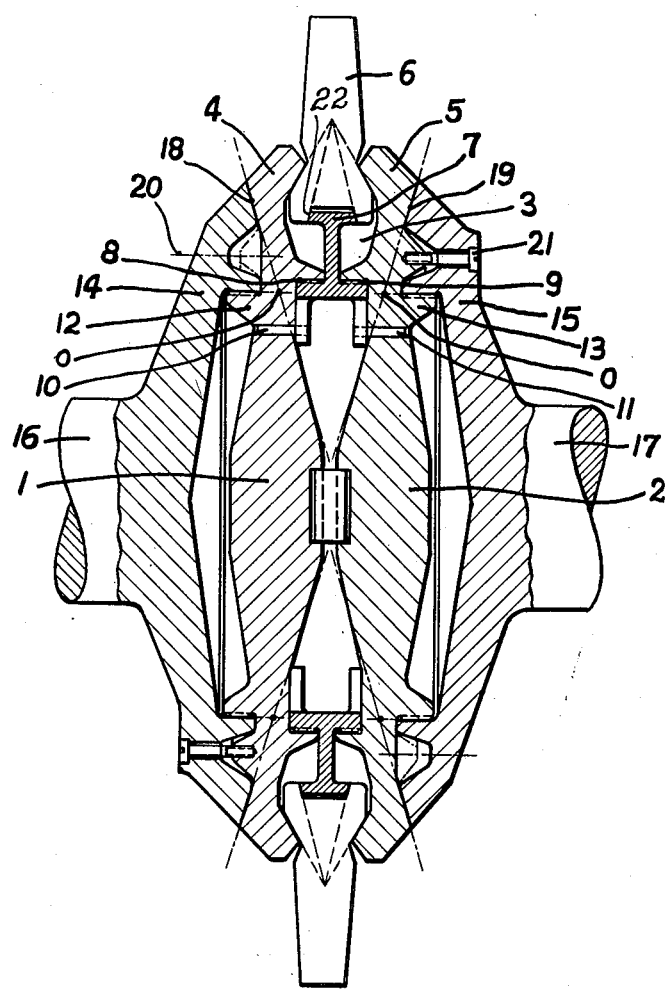
INVENTOR
CHRISTIAN SCHÖRNER
BY
Marechal & Biebel
ATTORNEYS Patented Jan. 12, 1954

2,665,880

UNITED STATES PATENT OFFICE 2,665,880

TURBINE ROTOR

Christian Schörner, Augsburg, Germany, assignor to Maschinenfabrik Augsburg-Nurnberg A. G., Augsburg, Germany, a corporation of Germany Application July 17, 1951, Serial No. 237,230

Claims priority, application Germany January 20, 1951

4 Claims. (Cl. 253—39)

This invention relates to turbine rotors of steel for high temperature service, comprising ceramic blades secured in an annular groove of the rim of the rotor. The invention has special reference to bipartite rotors of the type in which the groove for the roots of the blades is formed between two carrier discs making up together the complete rotor and being connected to the adjacent shaft ends of the turbine shaft. In such rotors, the shape of the annular groove and of the roots of the blades is adapted so that a positive engagement is ensured in operation, independently of different specific heat elongations at operational temperatures. The mounting of the blades in annular grooves permits to provide a sufficiently narrow pitch of the blade grid; however, with a view to the special requirements of the rated fatigue limit of the ceramic blade material the conical seating surfaces of the annular grooves have to be inclined at a relatively small angle in relation to the transverse middle plane of the blade grid. Thus the lateral flanges of the rotor each of which bears one half of the groove surface, are exposed to heavy axial thrust forces throughout the circumference, in addition to the load caused by the centrifugal forces. The over-turning moments thus exerted upon the thickened portion of the rim of each carrier disc not only produce additional strains which may impair the creep strength even of first class special steel at the intended high temperature of the propellant gas, but through the deformation occurring, which might even be of a permanent nature in the long run, the above mentioned special geometrical relation intended to ensure a positive engagement independently of the temperature and an unexceptional seat of the root of the ceramic blade in the steel rotor is unfavorably affected. However, such defects have to be strictly avoided in view of the brittleness of the ceramic material, since edgewise stresses would cause premature breakage of the ceramic blades or their loose seat may cause displacements, unbalances and touching or oscillation damages.

It is an object of the present invention to provide means for avoiding such disadvantages and to ensure a sufficient stiffness of the groove of the rotor.

With this and further objects in view, according to the present invention each carrier or rotor disc rim is provided, on its side facing away from the groove, with a conical supporting surface bearing on a corresponding surface of a flange-shaped supporting member extension of the adjacent part of the turbine shaft. For reasons of mechanical strength the carrier discs are advantageously shaped as rotary bodies without bores and if possible of the whole rotor unit only these carrier discs are made of a highly temperature resistant material. Therefore the carrier discs are advantageously connected with the shaft flanges by a threaded collar. The axial forces are also resisted in a relatively simple manner by arranging the threaded connection in the vicinity of the said conical support of the carrier disc rim. In order to obtain a solid connection which is reliably centered even under elevated temperature conditions, the inclination of the conical supporting surfaces is preferably adapted so that the circle formed by intersection of the imaginary extended conical surface with the cylinder of the clamping thread comes to lie approximately in the middle plane of the carrier disc body, since at this point the deformations by heat influences compared to the position in normal condition will be a minimum. It is very important for the quiet and safe operation of the rotor that its accurately centered position is maintained under all conditions. Moreover, this type of connection is of advantage since it permits to provide a reliable mechanical joint of the highly temperature-resistant carrier disc part of the rotor with the shaft end which is of an alloy containing less alloying additions than the carrier discs. Welding joints on the other hand would be very difficult to achieve between such different materials in view of the possibility of undesirable conversions of the structure occurring in the welding zone. Where a screw connection according to the present invention is used, differences of the physical properties are less important. Moreover, it is important that the supporting flange of the screw-connected shaft part can be made stiff enough, the more so as the gas ducts can be arranged in such a manner that these parts of the rotor are kept at a lower temperature.

The invention will be better understood by reference to the following detailed description in connection with the accompanying drawing showing by way of example and purely schematically one embodiment of the invention in an axial section.

Referring to the drawing, it will be seen that the turbine rotor comprises two rotor discs or carrier discs 1 and 2 receiving the ceramic blades 6 in the annular groove 3 between the two outer rims 4 and 5. The two discs 1 and 2 are held together by an inner ring 7 having externally threaded collars 8 and 9 for threadable engagement with female threads of the discs 1 and 2. The axial end faces 22 of the outer rim of ring 7 are conically shaped for positive engagement with correspondingly shaped inner seating surfaces of the roots of the blades 6. Bolts 10 and 11 serve to secure the screw joint formed by the threads 8 and 9. It is advisable to build up the rotor of constructional elements which are symmetrical about a central axis, in order to avoid weak points around the circumference which would be created for instance, in case of a construction of the carrier disc in one piece, by the gap required in this case for introducing the blades into the groove of the rotor and by the blade lock required for locking them therein.

The rotor or carrier discs 1 and 2 are formed with threaded extensions 12 and 13 by which they are screwed together with the adjacent supporting member flanges 14 and 15 of the shaft ends 16 and 17.

Provided at the outer ends of the supporting flanges 14 and 15 are the conical seating surfaces 18 and 19 cooperating with corresponding counter-surfaces on the free end faces of the rims of the rotor discs 1 and 2 for opposing the lateral forces produced by the centrifugal forces of the blades. It is important that these conical surfaces are aligned according to a circle defined by intersection of the cylindrical thread surface with the middle plane of the carrier disc, which circle is projected into the axial section as shown in the form of a point O. The screws 20 and 21 serve to secure the screw connection of the threaded extensions 12 and 13 in the position fixed as the parts are fitted. The preliminary tensions applied and the constructional shapes used will be adapted to the conditions of the respective case.

While in the drawing only a rotor for a single-stage turbine has been shown, the support of the rotor discs in accordance with the present invention may also be applied in a similar manner in the first and last stages of a rotor having several rows of blades, where the outwardly directed axial forces caused by the roots of the blades have to be resisted while the axial forces in the rim in the intermediate stages practically compensate each other.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In a gas turbine having blades secured in an annular groove around the rim of a rotor and a rotor shaft, the combination which comprises a pair of cooperating carrier members for carrying said blades, means for securing said carrier members together gripping said blades therebetween, bearing surfaces on said carrier members adjacent the extremes thereof, supporting members on said rotor shaft, means for affixing said carrier members to said supporting members, bearing surfaces on said supporting members for cooperating engagement with said bearing surfaces on said carrier members supporting said carrier members against separation.

2. In a gas turbine having ceramic blades secured in an annular groove around the turbine rotor, the combination which comprises a pair of cooperating carrier discs for carrying said blades, means for interlocking said discs in substantially face to face arrangement securing said blades therebetween, seating surfaces on the outside faces of said discs adjacent the rims thereof, a pair of turbine shaft members, flange members at the inner ends of said shaft members, means for affixing said carrier discs to said flange members, supporting member extensions on said flange members, and seating surfaces adjacent the rims of said extensions for cooperating engagement with said seating surfaces on said carrier discs supporting said rims of said carrying discs against flexing movement away from said blades.

3. In a gas turbine having turbine blades secured in an annular groove around the turbine rotor, the combination which comprises a pair of cooperating carrier discs for carrying said blades, means for interlocking said discs in substantially face to face arrangement gripping said blades therebetween, conical seating surfaces on the outside faces of said discs adjacent the rims thereof, supporting flange members, threaded screw means for affixing said carrier discs to said flange members, extensions on said flange members having conical seating surfaces for cooperating engagement with said conical seating surfaces on said carrier discs, the inclination of each said flange member conical seating surface being such that the radially inward projection thereof coincides substantially with the circle defined on the transverse mid plane of its respective carrier disc by a radius substantially equal to the radius of said threaded screw means.

4. In a gas turbine having a rotor with blades secured in an annular groove around the rim of said rotor, the combination which comprises a pair of cooperating rotor discs, means for interlocking said discs in substantially face to face arrangement forming a blade carrying unit for said rotor, rim portions on each said disc for gripping said blades therebetween and defining said annular groove, conical supporting surfaces on the outer faces of said rim portions, a pair of turbine shaft members, cooperating flange members at the inner ends of said shaft members, screw means for threaded engagement of said flange members with said carrier discs, supporting member extensions on said flange members adjacent the periphery thereof, conical supporting surfaces adjacent the rims of said extensions for cooperating engagement with said conical supporting surfaces on said carrier discs supporting said rim portions thereof against separation, the inclination of said supporting surfaces being such that the radially inward projection thereof coincides substantially with the circles defined on the transverse mid planes of said carrier discs with a radius substantially equal to the radius of said screw means.

CHRISTIAN SCHÖRNER.

References Cited in the file of this patent

UNITED STATES PATENTS

| Number | Name | Date |
| --- | --- | --- |
| 2,401,826 | Halford | June 11, 1946 |

OTHER REFERENCES

Serial No. 385,333, Schutte (A. P. C.), published May 25, 1943.